United States Patent [19]
Oka

[11] Patent Number: 5,304,613
[45] Date of Patent: Apr. 19, 1994

[54] POLYANILINE DERIVATIVE CONTAINING AT LEAST A 2-BUTENYLENE STRUCTURE

[75] Inventor: Osamu Oka, Shizuoka, Japan

[73] Assignee: Tomoegawa Paper Co., Ltd., Tokyo, Japan

[21] Appl. No.: 953,826

[22] Filed: Sep. 30, 1992

[30] Foreign Application Priority Data

Oct. 3, 1991 [JP] Japan .................................. 3-282007
Oct. 8, 1991 [JP] Japan .................................. 3-287213

[51] Int. Cl.$^5$ ............................................. C08G 73/00
[52] U.S. Cl. ..................................... 525/540; 525/50; 525/327.6; 528/271; 528/422
[58] Field of Search ...................... 525/540, 50, 327.6; 528/271, 422

[56] References Cited

U.S. PATENT DOCUMENTS 5,100,977 3/1992 Oka ..................................... 525/540

Primary Examiner—Harold D. Anderson
Attorney, Agent, or Firm—Oblon, Spivak, McClelland, Maier & Neustadt

[57] ABSTRACT

The present invention discloses to polyaniline derivatives which are soluble in an organic solvent and with which it is possible to produce a film having flexibility, and to a process for preparing the same. The present invention provides polyaniline derivatives comprising a structural unit which is indicated by the following formula (I)

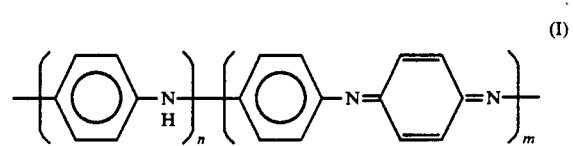

(I)

(wherein m is an integer of 0 or greater, and n is an integer of 2 or greater), and a structural unit which is indicated by the following formula (II)

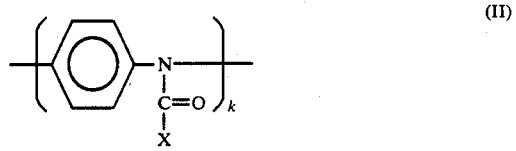

(II)

(wherein k is an integer from 1 to 2500, and x is a group with at least a 2-butenylene structure).

5 Claims, No Drawings

POLYANILINE DERIVATIVE CONTAINING AT LEAST A 2-BUTENYLENE STRUCTURE

BACKGROUND OF THE INVENTION

Field of The Invention

The present invention relates to polyaniline derivatives which can be dissolved in organic solvents and with which they are possible to produce a film having flexibility, and to a process for preparing the same.

In recent years, the application of polyaniline as a new electronic or conductive material in such varied fields as, for example, cell electrode materials, antistatic materials, electromagnetic shielding materials, functional devies—e.g., photoelectric transducers, optical memories and various sensors-, display devices, various hybrid materials, transparent electroconductors, and various terminal equipment.

However, generally, polyanilines have a highly developed $\pi$-conjugated systems, and therefore the main chain of polyaniline is stiff, and the interactions between the chains of molecules are strong. Because of the many strong hydrogen bonds which exist between the molecule chains, there are many organic solvents in which polyaniline is insoluble, nor can the polyaniline, and cannot be melted by heating. Therefore, a serious defect arises from the inability of polyanilie to be processed to a film.

Therefore, composite materials were prepared by impregnating a monomer comprising aniline with a backing of a desired shape such as that of a porous material or a fiber made of a polymer. The monomer was then polymerized by contacting the monomer with polymerizing catalysts or by electrolytic oxidation, or by using a thermal plasticity polymer powder. In contrast, a polyaniline soluble only in N-methyl-2-pyrrolidone in synthesized by controlling the reaction temperature and selecting polymerizing catalysts (M. Abe et al.; J. Chem. Soc, Chem. Commun., 1989,1736). However, this polyaniline also is insoluble in other ordinary organic solvents, and therefore the range of application of the polyaniline was limited. In addition, although soluble polyaniline derivatives were synthesized from many kinds of aniline derivatives, the films made of such polyaniline derivatives did not exhibit sufficient flexibility.

SUMMARY OF THE INVENTION

It is therefore an object of the present invention to solve the above problems, in other words, to provide a polyaniline derivatives which are soluble in an organic solvent and with which they are possible to produce a film having flexibility and, to provide a process for preparing the same.

According to a first aspect of the present invention, polyaniline derivatives are provided, comprising a structural unit which is indicated by the following formula (I)

(I)

(wherein m is an integer of 0 or greater, and n is an integer of 2 or greater.) and a structural unit which is indicated by the following formula (II)

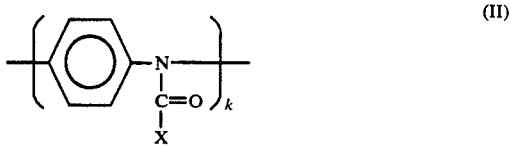

(II)

(wherein k is an integer from 1 to 2500, and x is a group having at least a 2-butenylene structure.)

According to a second aspect of the present invention, a process for obtaining polyaniline derivatives are provided, comprising the steps of: (a) obtaining a soluble polyaniline by treating polyaniline with ammonia, (b) obtaining a reduced polyaniline comprising a structural unit which is indicated by the following formula (V), and the number average molecular weight of which is from 2000 to 500000, this reduced polyaniline being obtained by treating the soluble polyaniline with hydrazine,

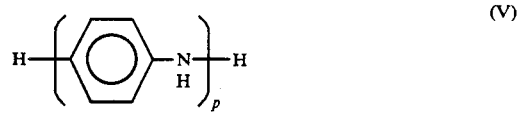

(V)

(wherein p is an integer from 10 to 5000.)

(c) reacting the reduced polyaniline with a polymer having a carboxyl group at one end and being indicated by the following formula (VI)

HOOC—X (VI)

(wherein X is a group having at least a 2-butenylene structure.) in the presence of a N,N'-disubstituted carbodiimide type of a greater chemical equivalent than the carboxyl group.

According to a third aspect of the present invention, a process for making polyaniline derivatives are provided, comprising the steps of:

(a) obtaining a soluble aniline polymer by treating polyaniline with ammonia, (b) obtaining a reduced polyaniline comprising a structural unit which is indicated by the following formula (V), and the number average molecular weight of which is from 2000 to 500000, this reduced polyaniline being obtained by treating the soluble polyaniline with hydrazine,

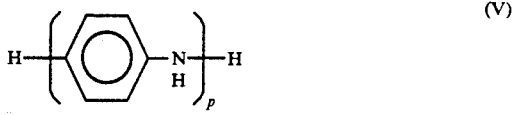

(V)

(wherein p is an integer from 10 to 5000.)

(c) reacting the reduced polyaniline with a polymer having a haloformyl group at one end and being indicated by the following formula (VII)

YOC—X (VII)

(wherein X is a group having at least a 2-butenylene structure, and Y is chlorine or bromine).

DETAILED DESCRIPTION OF THE PREFERRED EMBODIMENTS

The present invention provides polyaniline derivatives comprising a structural unit which is indicated by the following formula (I)

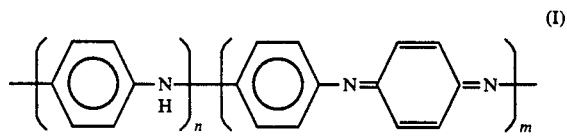

(wherein m is an integer of 0 or greater, and n is an integer of 2 or greater) and a structural unit which is indicated by the following formula (II)

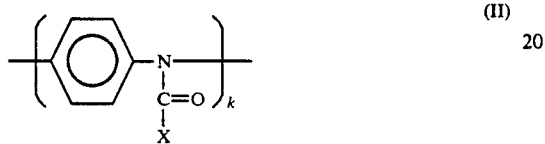

(wherein k is an integer from 1 to 2500, and x is a group with at least a 2-butenylene structure).

In polyaniline derivatives, X is a group which is indicated by the formula (II), that is a group having at least a 2-butenylene structure. The group having at least a 2-butenylene structure corresponds to a 1,4-polybutadiene structure or a butadiene-acrylonitrile copolymer structure, for example, groups which are indicated by the following formula (III) or formula (IV)

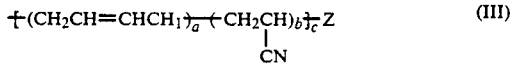

(wherein a is from 1 to 10, b is from 1 to 10, b/(a+b) is from 0.01 to 0.5, c is from 5 to 15, and z is 2-butenyl or hydrogen).

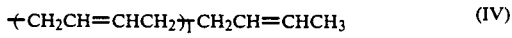

(wherein l is from 5 to 400).

The present invention provides polyaniline derivatives which comprise the structural unit shown by the above formula (I) and for which the relationship between the polyaniline having a number average molecular weight of 2000 to 500000 and the polymer comprising the structural elements shown by the above formula (II) is as follows:

m/(k+n)=0 to 100
k+2m+n=10 to 5000
k/(k+2m+n)=0.0001 to 0.5

In the above numeral limitation, the value of m/(k+n) is preferably 0 to 100. It is undesirable for this value to exceed 100, because a problem arises in that flexibility drops.

The value of k+n+m is preferably 10 to 5000. It is undesirable for this value to exceed 500, because a problem arises in that the solubility in the solvent falls markedly.

Furthermore, the value of k/(k+2m+n) is preferably about 0.0001 to 0.5. When the amount exceeds 0.5, a problem arises in that the conductivity decreases rapidly. When the amount is less than 0.0001, good solubility and flexibility cannot be obtained.

The present invention provides a process for obtaining polyaniline derivatives, comprising the steps of:

(a) obtaining a polyaniline by oxidative polymerization of aniline using ammonium persulfate as an oxidizing agent at low temperature such as within the range of from $-20°$ C. to $50°$ C., (b) obtaining a soluble polyaniline by treating the polyaniline with ammonia, (c) obtaining a reduced polyaniline whose number average molecular weight is from 20000 to 50000 [measured by GPC (a solvent of N-methyl-2-pyrrolidone), with the number average molecular weight in terms of polystyrene] and which is indicated by formula (V), by treating the soluble polyaniline with an excess of hydrazine, The hydrazine treatment is as follows:

(1) dispersing the polyaniline in water,
(2) in the above solution under nitrogen atomosphere, adding a chemical equivalent of hydrazine in a quantity equal to or greater than, and preferably three times more than, that of the nitrogen atoms in the polyaniline,
(3) stirring the solution for 24hrs or more, at temperatures of from $0°$ C. to $30°$ C., (d) dissolving the above reduced polyaniline in an amide solvent such as N-methyl-2-pyrrolidone or N,N-dimethylacetamide (although the reduced polyaniline is soluble in the above solvent, it is insoluble in other ordinary organic solvents such as chloroform, tetrahydrofuran), (e) dissolving in pyridine a polymer comprising at least a 2-butenylene structure having a carboxyl group at one end, (f) while cooling down to from $-10°$ to $10°$ C., adding to the above solution N,N'-disubstituted carbodiimide in an amount which is an equal or greater chemical equivalent with respect to the carboxyl group at the end of the above polymer, (g) stirring the solution at the same temperature for from 1 hr to 4 hrs, (h) adding the amide solvent of reduced polyaniline to the solution, (i) stirring for from 1 hr to 24 hrs while cooling down slowly to room temperature, (j) precipitating the generated polymer by pouring the reaction mixture into dilute hydrochloric acid, (k) because the polymer is doped with hydrochloric acid, undoping the polymer with aqueous ammonia or ammonia vapor.

The present invention provides a process for making polyaniline derivatives, comprising the following step. Steps (a) through (d) as above, (e') dissolving in chloroform a polymer comprising at least a 2-butenylene structure having a haloformyl group at one end, (f') adding dropwise the above solution slowly into an amide solution of reduced polyaniline, (g') stirring the solution for from 1 hr to 24 hrs, (h') precipitating the generated polymer by pouring the reaction mixture into dilute hydrochloric acid, (i') because the polymer is doped with hydrochloric acid, undoping the polymer with aqueous ammonia or ammonia vapor.

It is well-known that the value of k+2m+n (k,m,n are in formulas (I),(II)) in the formula of the polyaniline derivatives of the present invention is equal to that of the reduced polyaniline, p, which is the degree of polymerization in formula (V) indicated the structural unit of the reduced polyaniline. p is then therefore equal to value of $k+2m+n$ of the raw material.

Further, the ratio of $m:k+n$ (k,m,n in formulas (I),-(II)) can be controlled by oxidizing (m increases) or by reducing (k+n increases) following the completion of a grafting copolymerization. The oxidation or the reduction can be carried by contacting the product with an oxidizing agent or a reducing agent, or by an electrochemical reaction. The ratio of $m:k+n$ can be measured using $^{13}$C-NMR by comparing, the peak intensity related to a quinoid structure with that related to benzonode.

Moreover, the polyaniline derivatives according to the present invention are further characterized in that they are comb shaped polymers in which side chains of fixed length represented by the above formula (II) are regularly attached along the main chain shown by the above formula (I). The present invention can use N-methyl-2-pyrrolidone, N,N-dimethylacetamide, N,N-dimethylformamide, hexamethylphospholic triamide, 1,3-dimethyl-2-imidazolidinon or the like as the amide solvent.

The present invention uses a polymer which has a carboxyl group at one end, and which is indicated by the following formula (VI)

HOOC—X  (VI)

(wherein X is a group with at least a 2-butenylene structure).

Where producing polyaniline derivatives using a copolymer having an acrylonitrile structure as the raw material, the X in the above formula (VI), that is the group having at least a 2-butenylene structure, is preferably a copolymer having a butadiene-acrylonitryl copolymer structure, and, more preferably, is a copolymer having the structure which is indicated by the following formula (III)

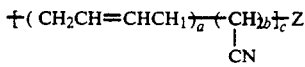  (III)

(wherein a is from 1 to 10, b is from 1 to 10, b/(a+b) is from 0.01 to 0.5, c is from 5 to 15, and z is 2-butenyl or hydrogen)

Moreover, the present invention can use Hycar CTBN (marketed by Goodrich) as the polymer having a carboxyl group at one end. Still further, additional examples include the group having the structure which is indicated by the following formula (IV)

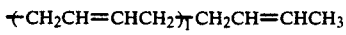  (IV)

(wherein 1 is an integer from 5 to 4) can be used in the present invention.

The present invention uses a polymer which has a haloformyl group at one end and which is indicated by the following formula (VII)

YOC—X  (VII)

(wherein, X is a group with at least a 2-butenylene structure, and Y is chlorine or bromine.)

In the case of producing polyaniline derivatives using a copolymer having an acrylonitrile structure as the raw material, the X in the above formula (VII), that is the group having at least a 2-butenylene structure, is preferably a copolymer having a butadiene-acrylonitryl copolymer structure, and, more preferably, is a copolymer having the structure which is indicated by the following formula (III)

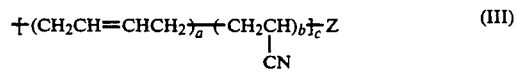  (III)

(wherein a is from 1 to 10, b is from 1 to 10, b/(a+b) is from 0.01 to 0.5, c is from 5 to 15, and z is 2-butenyl or hydrogen.)

Still further, as an additional example, the group having the structure which is indicated by the following formula (IV)

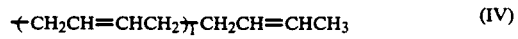  (IV)

(wherein 1 is an integer from 5 to 400) can be used in the present invention.

In general, the polymer having a haloformyl group at one end can be derived easily from the carboxylic acid which is indicated by formula (V), or from the ester thereof (an ester of a lower alcohol, such as methyl, ethyl, etc), or from the salt thereof (such as a salt of an alkali metal, an ammonium salt or the like).

In the case where obtaining a polymer having a haloformyl group at a terminal from the above carboxylic acid, an inorganic halide such as phosphoryl chloride, thionyl chloride, phosphorus pentachloride, or phosphorus trichloride is added in the amount of a chemical equivalent or greater with respect to the carboxylic acid. In the reaction, zinc chloride, pyridine, iodine, triethylamine or the like can be used as the catalyst.

Alternatively, the polymer can be derived by reacting the carboxylic acid with an organic halide, e.g. an acid halide such as benzoyl chloride, phthaloyl chloride, oxalyl chloride, an organic phosphorous halide such as of the $\alpha,\alpha$-dihalogenoethers, halogenated alkyl amines, triphenylphosphine/carbon tetrachloride, pyrocatechylphosphorus trichloride, diethylhalophsphorus chloride, triphenylhalophsphorus bromide or the like.

Where deriving the above polymer from a carboxylic acid ester, the polymer utilized in the present invention having a haloformyl group at the terminal can be obtained utilizing triphenylhalophosphorous halide or a boron fluoride complex with carboxylic acid ester.

Where deriving the above polymer from a carboxylate, the polymer utilized in the present invention having a haloformyl group at the terminal can be obtained utilizing an inorganic halogen compound such as phosphoryl chloride, phosphorus pentachloride, or a thionyl chloride and dimethylformamide complex with dicarboxylic acid.

Any reaction will do, provided that it is one in which the carboxyl group can be converted into a haloformyl group.

The N,N'-disubstituted carbodiimides used in the present invention is indicated by the following formula (VIII)

R'—N=C=N—R"  (VIII)

(wherein R,R' may be either identical or not, and is for example, an alkyl group such as methyl, ethyl, n-propyl, i-propyl, n-butyl, t-butyl, or 3-dimethylaminopropyl, a cycloalkyl group such as cyclohexyl, an aryl group such as phenyl, p-tolyl, m-tolyl, p-N,N-dimethylaminophenyl, p-chlorophenyl, p-nitrophenyl, or p-cyanophenyl).

Concretely, the N,N'-disubstituted carbodiimide is illustrated by diethylcarbodiimide, diisopropylcarbodiimide, dicyclohexylcarbodiimide, diphenylcarbodiimide, di-p-tolylcarbodiimide, 1-ethyl-3-(3-dimethylaminopropyl)carbodiimide or the like.

As from the above explanation, the amount of nitrogen atoms participating in the branch in formula (II) is preferably about 0.01% to 50% of the amount of nitrogen atoms in polyaniline. Where the amount exceeds 50%, a problem arises in that conductivity falls rapidly. Where the amount is less than 0.01%, a problem arises in that good solubility and flexibility cannot be obtained.

The polyaniline derivatives of the present invention obtained by the above processes can be dissolved in an amide solvent such as N-methyl-2-pyrrolidone, N,N-dimethylacetoamide, or a halogenated hydrocarbon solvent such as chloroform, dichloroethane, dichloromethane, or an ether solvent such as tetrahydrofuran, or an amine solvent such as pyridine, or a polar solvent such as dimethylsulfoxide.

Moreover, processed goods such as film or fiber made from polyaniline derivatives show high conductivity of $10^{-3}$ to 10 s/cm by doping with an acceptive dopant.

Any dopant will do, provided that it can be used as a dopant in the doping of conductive polymer. Concretely, the dopant is illustrated by a halide such as iodine, bromine, chlorine, and iodine trichloride, or by an acid (proton donor) such as sulfuric acid, hydrochloric acid, nitric acid, perchloric acid, and hydrofluoroboric acid, or by a salt of the acid, or by a Lewis acid such as alminium trichloride, iron trichloride, molybdenum chloride, antimony chloride, and arsenic pentafluoride, or by an organic acid such as acetic acid, trifluoroacetic acid, benzenesulfonic acid, and p-toluenesulfonic acid.

There is no limitation on the method of doping with the above dopants, all well-known methods can be used. In general, the methods can be carried out by contacting the dopant compound with polyaniline derivatives or with the processed goods, in a liquid phase or gas phase. Moreover, it is also possible to carry out doping electrically in a solution of the acid (proton donor) or a salt thereof.

DETAILED DESCRIPTION OF PREFERRED EMBODIMENTS

First Embodiment

The polyaniline derivative was prepared by the process, comprising the following steps:

(a) 4.1 g of aniline and 21.9 g of concentrated hydrochloric acid were dissolved in water, water was added until the total volume was to 100 ml and then cooling down to $-5°$ C. was performed. The oxidation polymer was prepared by dissolving 21.9 g of concentrated hydrochloric acid and 6.28 g of ammonium persulfate in water, adding water until the total volume was 100 ml and then cooling down to $-10°$ C. This was then dropped into the aniline solution, and stirred for 6 hrs at $-10°$ C. The number average molecular weight of the oxidation polymer was 12000 (in terms of polystyrene, measured in GPC (N-methyl-2-pyrrolidone solvent), $2m+n=130$, $m/n=0.5$). The thus obtained oxidated polyaniline was then prepared by washing entirely, and (b) carrying out undope processing with aqueous ammonia, thereby obtaining the soluable polyaniline. (c) Grayish white colored reduced polyaniline was obtained by dissolving the 200 ml of soluble polyaniline in water, adding 50 ml of hydrazine under nitrogen stream, stirring for 24 hrs at room temperature, filtering, and drying. (d) 1 g of reduced polyaniline obtained in this way (the number average molecular weight of 12000, $2m+n=130$, $m/n=0$) was dissolved entirely in 30 ml of N-methyl-under nitrogen stream.

(e) In contrast, the polyaniline derivative of the present invention was prepared by dissolving 1.97 g of 1,4-polybutadiene having a carboxyl group at one end (molecular weight of about 3600) into 30 ml of pyridine, (f) adding 0.2266 g of N,N'-dicyclohexylcarbodiimide while cooling down to 0° C., (g) stirring for 1 hr at 0° C., (h) adding the reduced polyaniline, and (i) reacting for 6 hrs while increasing temperature to room temperature slowly. (j) After completion of the reaction, the solution was poured into dilute hydrochloric acid while stirring. The precipitate generated was filtered, and (k) was exposed to ammonia vapor. Hydrogen halide was removed by washing with water, and drying.

Absorptions of 1645 cm$^{-1}$ (C=O streching), and 2850 to 2950 cm$^{-1}$ (aliphatic C—H streching), which are caused by the structure which is indicated by formula (II), were observed when an infrared absorption of the polyaniline derivative which is indicated by formula (II) was measured. In addition, the absorption patterns at 1600, 1500. 1300, 1170, and 820 c$^{-1}$ characteristic of the polyaniline which is indicated by formula (I) were observed, thereby confirming that the main chain of the polymer had a polyaniline structure.

It was proved from the reaction yield of the derivative that the amount of nitrogen atoms which participated in forming the branch structure indicated by formula (II) was about 9% that of polyaniline, and that the value of $k+2m+n$ was 130.

Furthermore, the value of $m/(k+n)$, which is the ratio of the intensity between the spectral peak in C$^{13}$ NMR (chemical shift 138 ppm/TMS) originating from a quinoid structure and the spectral peak in C$^{13}$ NMR (chemical shift 122 ppm/TMS) originating from a benzenoid structure, is 0.42.

Very flexible film made of the obtained polyaniline derivative was prepared by dissolving 1 g of the derivative into 5 g of N-methyl-2-pyrrolidone at room temperature, and casting. The film was then doped by soaking in a 20%-sulfuric acid solution for 24 hrs and drying. The conductivity of the film was 0.1 S/cm.

It is possible to use an organic solvent such as N,N-dimethylacetoamide, N,N-dimethylformamide, pyridine, chloroform, dichloroethane, dichloromethane, or tetrahydrofurane instead of N-methyl-2-pyrrolidone.

Second Embodiment

Utilizing 0.2 g of 1,4-polybutadiene having a carboxyl group at one end and 0.0452 g of N,N'-dicyclehexylcarbodiimide, 1.15 g of the polyaniline derivative was obtained by following the same processes as that of the first embodiment.

Absorptions of 1645 cm$^{-1}$ (C=O streching), and 2850 to 2950 cm$^{-1}$ (aliphatic C—H streching), which are caused by the structure indicated by formula (II), were observed when an infrared absorption of the polyaniline derivative was measured. In addition, absorption patterns at 1600, 1500, 1300, and 1170, 820 cm$^{-1}$ characteristic of the polyaniline which is indicated by formula (I) were observed, thereby confirming that the main chain of the polymer had a polyaniline structure.

It was proved from the reaction yield of the polyaniline derivative that the amount of nitrogen atoms which participated in forming the branch structure indicated by formula (II) was about 0.8% that of polyaniline, and that the value of k+2m+n was 130.

Furthermore, the value of m/(k+n), which is the ratio of the intensity between the spectral peak in C$^{13}$ NMR (chemical shift 138 ppm/TMS) originating from a quinoid structure and . the spectral peak in C$^{13}$ NMR (chemical shift 122 ppm/TMS) originating from a benzenoid structure, was 0.49.

Very flexible film made of the obtained polyaniline derivative was prepared by dissolving 1 g of the derivative in 5 g of N-methyl-2-pyrrolidone at room temperature, and casting. The film was then doped by soaking in a 20%-sulfuric acid solution for 24 hrs and drying. The conductivity of the film was 0.1 S/cm.

It is possible to use an organic solvent such as N,N-dimethylacetoamide, N,N-dimethylformamide, pyridine, chloroform, dichloroethane, dichloromethane, or tetrahydrofurane instead of N-methyl-2-pyrrolidone.

Third Embodiment

Utilizing 5.93 g of 1,4-polybutadiene having a carboxyl group at one end and 0.878 g of N,N'-dicyclehexylcarbodiimide, 6,85 g of the polyaniline derivative was obtained by following the same processes as that of the first embodiment.

Absorptions of 1645 cm$^{-1}$ (C=O streching), and 2850 to 2950 cm$^{-1}$ (aliphatic C—H streching) which are caused by the structure indicated by formula (II) were observed when the infrared absorption of the polyaniline derivative indicated by formula (II) was measured. In addition, absorption patterns at 1600, 1500, 1300 , 1170, and 820 cm$^{-1}$ characteristic of the polyaniline which is indicated by formula (I) were observed, thereby confirming that the main chain of the polymer had a polyaniline structure.

It was proved from the reaction yield of the derivative that the amount of nitrogen atoms which participated in forming the branch structure indicated by formula (II) is about 13% that of polyaniline, and that the value of k+2m+n was 130.

Furthermore, the value of m/(k+n), which is the ratio of the intensity of the spectral peak in C$^{13}$ NMR (chemical shift 138 ppm/TMS) originating from a quinoid structure and the spectral peak in C$^{13}$ NMR (chemical shift 122 ppm/TMS) originating from a benzenoid structure, was 0.38.

Very flexible film made of the obtained polyaniline derivative was prepared by dissolving 1 g of the derivative in 5 g of N-methyl-2-pyrrolidone at room temperature, and casting. The film was then doped by soaking in a 20%-sulfuric acid solution for 24hrs and drying. The conductivity of the film was 0.01 S/cm.

It is possible to use an organic solvent such as N,N-dimethylacetoamide, N,N-dimethylformamide, pyridine, chloroform, dichloroethane, dichloromethane, or tetrahydrofurane instead of N-methyl-2-pyrrolidone.

Fourth Embodiment

First, the steps were carried out as follows, to derive the halofolmyl group from the carboxyl group of 1,4-polybutadiene having a carboxyl group at the terminal:

1.97 g of 1,4-polybutadiene having a carboxyl group at one end (molecular weight was about 3600) was dissolved in 20 ml of dehydrated benzene. Then the solution was dissolved in 0.28 g of oxalyl chloride and a viscous liquid was obtained by reacting at 70° C. for 3 hrs.

It was observed by the change in infrared absorption that the carboxyl group at one end of the polymer was changed to a chloroformyl group (the absorption at about 1740 cm$^{-1}$ originating from the carboxyl group disappeared, while absorption at 1792 cm$^{-1}$ originating from a chloroformyl group appeared).

Moreover, the following processes were carried out:

A polyaniline derivative was prepared by (e') adding the above obtained liquid to 10 ml of dehydrated chloroform, (f') slowly dropping this mixture, under nitrogen steam, into 30ml of N-methyl-2-pyrrolidone in which 1 g of reduced polyaniline has been completely dissolved, and (g') reacting at room temperature for 4 hrs. After completion of the reaction, (h') the solution was poured into 1l of dilute hydrochloric acid while stirring. 2.78 g of the polyaniline derivative of the present invention was obtained by filtering and (i') was exposed to ammonia vapor. Hydrogen halide was removed by washing with water, and drying.

Absorptions of 1645 cm$^{-1}$ (C=O streching), and 2850 to 2950 cm$^{-1}$ (aliphatic C—H streching) which are cause structure indicated by formula (II) were observed when the infrared absorption of the polyaniline derivative, which is indicated by formula (II), was measured. In addition, absorption patterns at 1600, 1500, 1300 , 1170, and 820 cm$^{-1}$ characteristic of the polyaniline which is indicated by formula (I) were observed, thereby confirming that the main chain of the polymer had a polyaniline structure.

It was proved from the reaction yield of the polyaniline derivative that the amount of nitrogen atoms which participated in forming the branch structure indicated by formula (II) was about 9% that of polyaniline, and that the value of k+2m+n was 130.

Furthermore, the value of m/(k+n), which is the ratio of the intensity between the spectral peak in C$^{13}$ NMR (chemical shift 138 ppm/TMS) originating from a quinoid structure and the spectral peak in C$^{13}$ NMR (chemical shift 122 ppm/TMS) originating from a benzenoid structure, was 0.41.

Very flexible film made of the obtained polyaniline derivative was prepared by dissolving 1 g of the derivative into 5 g of N-methyl-2-pyrrolidone at room temperature, and casting. The film was then doped by soaking in a 20%-sulfuric acid solution for 24hrs and drying. The conductivity of the film was 0.09 S/cm.

It is possible to use an organic solvent such as N,N-dimethylacetoamide, N,N-dimethylformamide, pyridine, chloroform, dichloroethane, dichloromethane, or tetrahydrofurane instead of N-methyl-2-pyrrolidone.

Fifth Embodiment 2.78 g of the polyaniline derivative was prepared by a process, comprising the following steps:

Steps (a) through (d), which were carried out as in the first embodiment, then, (e) dissolving 1.97 g of Hycar CTBN butadiene-acrylonitrile copolymer (molecular weight of about 3600, b/(a+b) =0.17; made by Goodrich Co.) in 30ml of pyridine, (f) while cooling down to 0° C, adding 0.2266g of N,N'-dicyclohexylcarbodiimide, (g) stirring at 0° for 1 hr, (h) adding the reduced polyaniline solution (molecular weight of the reduced polyaniline was 12000, with a degree of polymerization p=130), (i) reacting for 6 hrs while increasing temperature to room temperature slowly, and, following completion of the reaction, (j) pouring the solution into 1l of dilute hydrochloric acid while stirring. The polyaniline derivative of the present invention was obtained by (k) filtering, and was exposed to ammonia vapor. Hydrogen halide was removed by washing with water, and drying.

Absorptions of 1645 cm$^{-1}$ (C=O streching), 2236 cm$^{-1}$ (CN streching), and 2850 to 2950 cm$^{-1}$ (aliphatic C—H streching) originating from the structure indicated by formula (II) were observed when the infrared absorption of the polyaniline derivative indicated by formula (II) was measured. In addition, absorption patterns at 1600, 1500, 1300, 1170, and 820 cm$^{-1}$ characteristic of the polyaniline which is indicated by formula (I) were observed, thereby confirming that the main chain of the polymer had a polyaniline structure.

It was proved from the reaction yield of the derivative that the amount of nitrogen atoms which participated in forming the branch structure indicated by formula (II) was about 9% that of polyaniline, and that the value of k+2m+n was 130.

Furthermore, the value of m/(k+n), which is the ratio of the intensity between the spectral peak in C$^{13}$ NMR (chemical shift 138 ppm/TMS) originating from a quinoid structure and the spectral peak in C$^{13}$ NMR (chemical shift 122 ppm/TMS) originating from a benzenoid structure, was 0.42.

Very flexible film made of the obtained polyaniline derivative was prepared by dissolving 1 g of the derivative into 5 g of N-methyl-2-pyrrolidone at room temperature, and casting. The film was then doped by soaking in a 20%-sulfuric acid solution for 24hrs and drying. The conductivity of the film was 0.1 S/cm.

It is possible to use an organic solvent such as N,N-dimethylacetoamide, N,N-dimethylformamide, pyridine, chloroform, dichloroethane, dichloromethane, or tetrahydrofurane instead of N-methyl-2-pyrrolidone.

Sixth Embodiment 1.15 g of the polyaniline derivative was obtained by following the same processes as that of the fifth embodiment utilizing 0.20 g of Hycar CTBN butadiene-acrylonitrile copolymer (molecular weight of about 3600, and b/(a+b) TM 0.17; made by Goodrich Co.) and 0.0452 g of N,N'-dicyclohexylcarbodiimide.

Absorptions of 1645 cm$^{-1}$ (C=O streching), 2236 cm$^{-1}$ (CN streching), and 2850 to 2950 cm$^{-1}$ (aliphatic C—H streching) originating from the structure indicated by formula (II) were observed when the infrared absorption of the polyaniline derivative which is indicated by formula (II) was measured. In addition, absorption patterns at 1600, 1500, 1300, 1170, and 820 cm$^{-1}$ characteristic of the polyaniline which is indicated by formula (I) were observed, thereby confirming that the main chain of the polymer had a polyaniline structure.

It was proved from the reaction yield of the derivative that the amount of nitrogen atoms which participated in forming the branch structure indicated by formula (II) was about 0.8% that of polyaniline, and that the value of k+2m+n was 130.

Furthermore, the value of m/(k+n), which is the ratio of the intensity between the spectral peak in C$^{13}$ NMR (chemical shift 138 ppm/TMS) originating from a quinoid structure and the spectral peak in C$^{13}$ NMR (chemical shift 122 ppm/TMS) originating from a benzenoid structure, was 0.49.

Very flexible film made of the obtained polyaniline derivative was prepared by dissolving 1 g of the derivative into 5 g of N-methyl-2-pyrrolidone at room temperature, and casting. The film was doped by soaking in a 20%-sulfuric acid solution for 24 hrs and drying. The conductivity of the film was 0.1 S/cm.

It is possible to use an organic solvent such as N,N-dimethylacetoamide, N,N-dimethylformamide, pyridine, chloroform, dichloroethane, dichloromethane, or tetrahydrofurane instead of N-methyl-2-pyrrolidone.

Seventh Embodiment 6.85 g of the polyaniline derivative was obtained by following the same processes as that of the fifth embodiment utilizing 5.93 g of Hycar CTBN butadiene-acrylonitrile copolymer (molecular weight of about 3600, b/(a+b)=0.17; made by Goodrich Co.) and 0.878 g of N,N'-dicyclohexylcarbodiimide.

Absorptions of 1645 cm$^{-1}$ (C=O streching), 2236 cm$^{31}$ (CN streching), and 2850 to 2950 cm$^{-1}$ (aliphatic C—H streching) originating from the structure indicated by formula (II) were observed when the infrared absorption of the polyaniline derivative which is indicated by formula (II) was measured. In addition, absorption patterns at 1600, 1500, 1300, 1170, and 820 cm$^{-1}$ characteristic of the polyaniline which is indicated by formula (I) were observed, thereby confirming that the main chain of the polymer had a polyaniline structure.

It was proved from the reaction yield of the derivative that the amount of nitrogen atoms which participated in forming the branch structure which is indicated by formula (II) was about 13% that of polyaniline, and that the value of k+2m+n wa 130.

Furthermore, the value of m/(k+n), which is the ratio of the intensity between the spectral peak in C$^{13}$ NMR (chemical shift 138 ppm/TMS) originating from a quinoid structure and the spectral peak in C$^{13}$ NMR (chemical shift 122 ppm/TMS) originating from a benzenoid structure, was 0.38.

Very flexible film made of the obtained polyaniline derivative wa prepared by dissolving 1 g of the derivative into 5 g of N-methyl-2-pyrrolidone at room temperature, and casting. The film was doped by soaking in a 20%-sulfuric acid solution for 24 hrs and drying. The conductivity of the film was 0.01 S/cm.

It is possible to use an organic solvent such as N,N-dimethylacetoamide, N,N-dimethylformamide, pyridine, chloroform, dichloroethane, dichloromethane, or tetrahydrofurane instead of N-methyl-2-pyrrolidone.

Eighth Embodiment

First, the steps were carried out as follows, deriving the halofolmyl group from the carboxyl group of butadiene-acrylonitrile copolymer having a carboxyl group at one end:

A viscous liquid was prepared by dissolving 1.97 g of Hycar CTBN butadiene-acrylonitrile copolymer (molecular weight of about 3600, b/(a+b) =0.17; made by Goodrich Co.) having a carboxyl group at one end in 20 ml of dehydrated benzene, adding 0.28 g of oxalyl chloride, reacting at 70° C. for 3 hrs, and then removing the solvent under reduced pressure.

It was observed by the change in infrared absorption that a carboxyl group at one end of the polymer was converted to a chloroformyl group (the absorption at about 1740 cm$^{-1}$ originating from the carboxyl group disappeared, while absorption at 1792 cm$^{-1}$ originating from a chloroformyl group appeared).

2.78 g of the polyaniline derivative of the present invention was prepared by (e') dissolving the liquid in 10 ml of dehydrated chloroform, (f') slowly dropping this mixture, under nitrogen steam, into 30 ml of N-methyl-2-pyrrolidone in which 1 g of reduced polyaniline has been completely dissolved, (g') reacting at room temperature for 4 hrs, and, following completion of the reaction, (h') pouring the solution into 1 l of dilute hydrochloric acid while stirring, then filtering and (i') exposing to ammonia vapor. Hydrogen halide was removed by washing with water, and drying.

Absorptions of 1645 cm$^{-1}$ (C=O streching), 2236 cm$^{-1}$ (CN streching) and 2850 to 2950 cm$^{-1}$ (aliphatic C—H streching) originating from the structure indicated by formula (II) were observed when the infrared absorption of the polyaniline derivative which is indicated by formula (II) was measured. In addition, absorption patterns at 1600, 1500, 1300, 1170, and 820 cm$^{-1}$ characteristic of the polyaniline which is indicated by formula (I) were observed, thereby confirming that the main chain of the polymer had a polyaniline structure.

It was proved from the reaction yield of the derivative that the amount of nitrogen atoms which participated in forming the branch structure which is indicated by formula (II) was about 9% that of polyaniline, and that the value of k+2m+n was 130.

Furthermore, the value of m/(k+n), which is the ratio of the intensity between the spectral peak in C—NMR (chemical shift 138 ppm/TMS) originating from a quinoid structure and the spectral peak in C$^{13}$ NMR (chemical shift 122 ppm/TMS) originating from a benzenoid structure, was 0.41.

Very flexible film made of the obtained polyaniline derivative was prepared by dissolving 1 g of the derivative into 5 g of N-methyl-2-pyrrolidone at room temperature, and casting. The film was doped by soaking in a 20%-sulfuric acid solution for 24 hrs and drying. The conductivity of the film was 0.09 S/cm.

It is possible to use an organic solvent such as N,N-dimethylacetoamide, N,N-dimethylformamide, pyridine, chloroform, dichloroethane, dichloromethane, or tetrahydrofurane instead of N-methyl-2-pyrrolidone.

THE EFFECT OF THE PRESENT INVENTION

Using the polyaniline derivatives of the present invention, while are soluble in a variety of organic solvents, a flexible film can be obtained by casting. Furthermore, the polyaniline derivatives can be processed by coating or the like. Through doping, the polyaniline derivatives have a high conductivity and, therefore, are very useful as electronic or conductive material or the like.

What is claimed is:

1. A polyaniline derivative comprising at least one structural unit of formula (I)

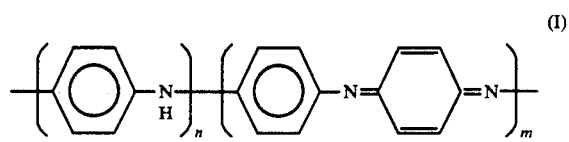

wherein m is an integer of 0 or greater, and n is an integer of 2 or greater, and at least one structural unit of formula (II)

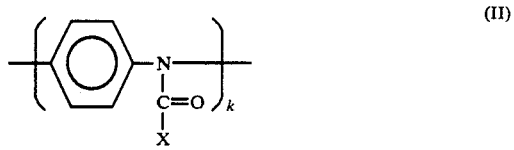

wherein k is an integer from 1 to 2,500, and X is a group having at least a 2-butylene structure.

2. The polyaniline derivative of claim 1, wherein X of formula (II) is a group having a butadiene-acrylonitrile copolymer structure.

3. The polyaniline derivative of claim 2, wherein X is a butadiene-acrylonitrile copolymer of formula

wherein a is from 1 to 10, b is from 1 to 10, b/(a+b) is from 0.01 to 0.5, c is from 5 to 15, and Z is 2-butylene or Z is hydrogen.

4. The polyaniline derivative of claim 1, wherein the number average molecular weight of the structural unit represented by formula (I) is from 2000 to 500,000; and
m/(k+n)=0–100
k+2m+n=10 to 5,000
k/(k+2m+n)=0.0001 to 0.5.

5. The polyaniline derivative of claim 1, wherein X is a group represented by formula (IV)

wherein l is from 5 to 400.

* * * * *